Jan. 26, 1932.  C. F. RAUEN  1,842,798
POWER TRANSMISSION
Filed Oct. 19, 1923  3 Sheets-Sheet 1
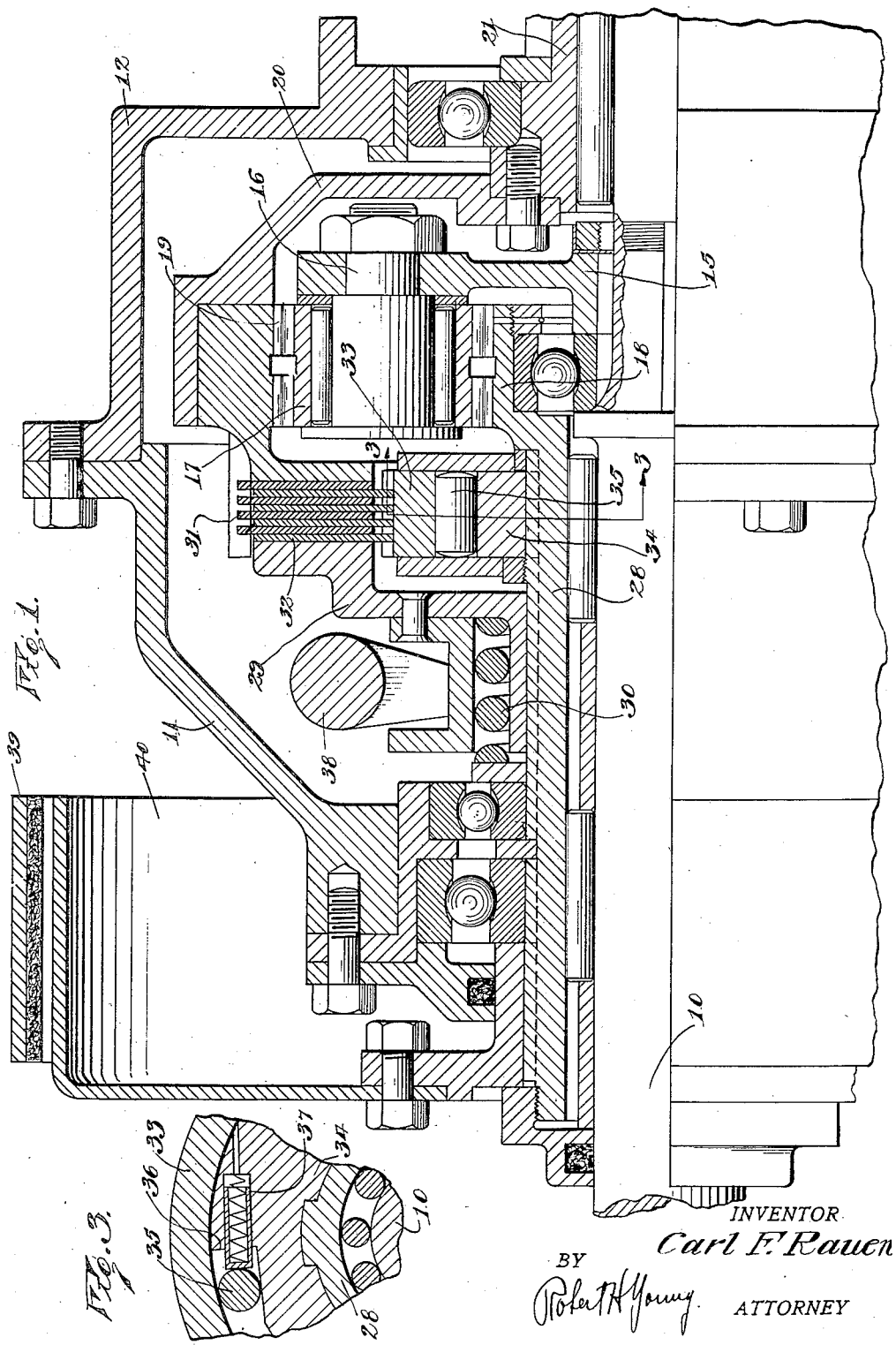
INVENTOR
Carl F. Rauen
BY
Robert H. Young
ATTORNEY

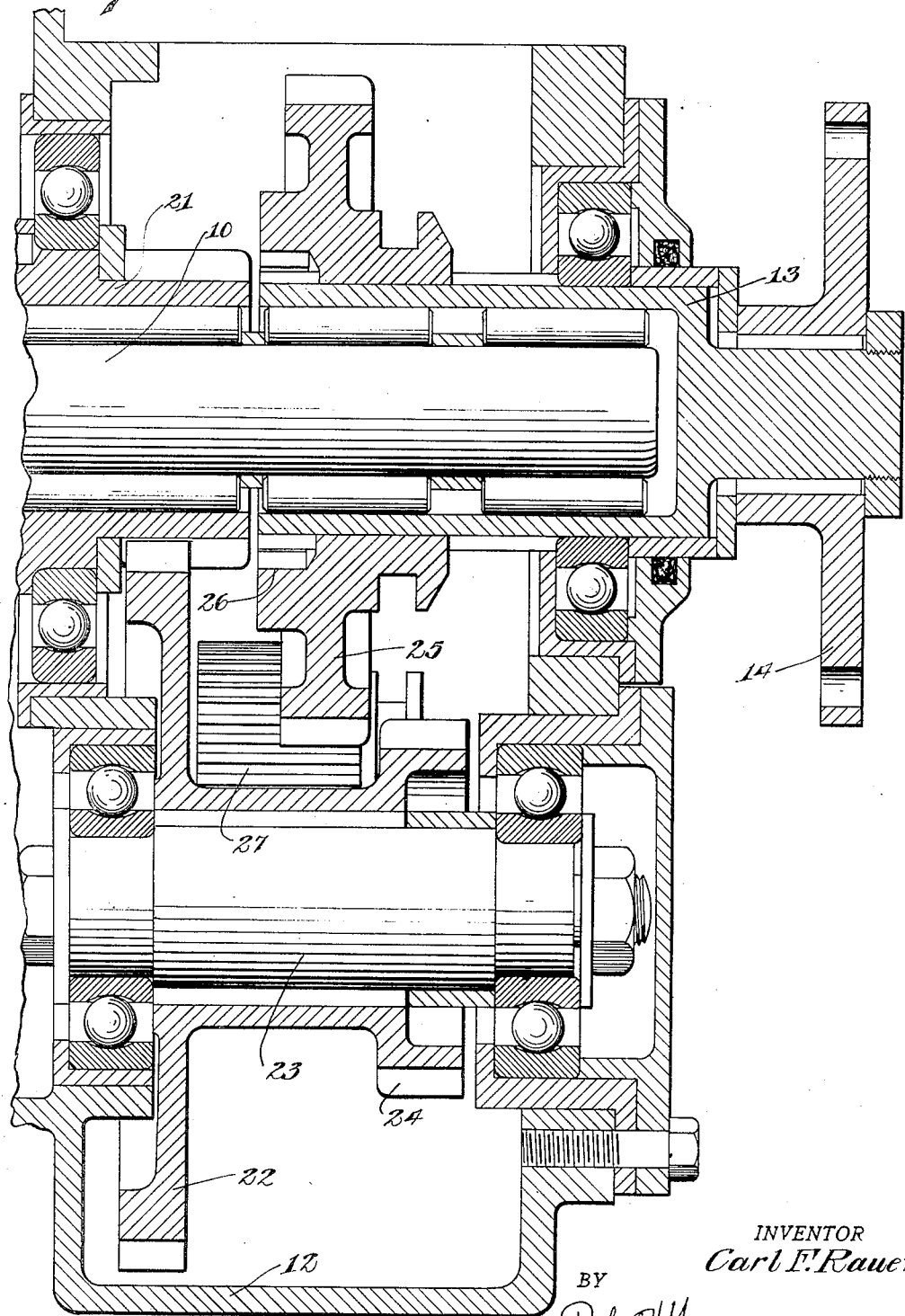

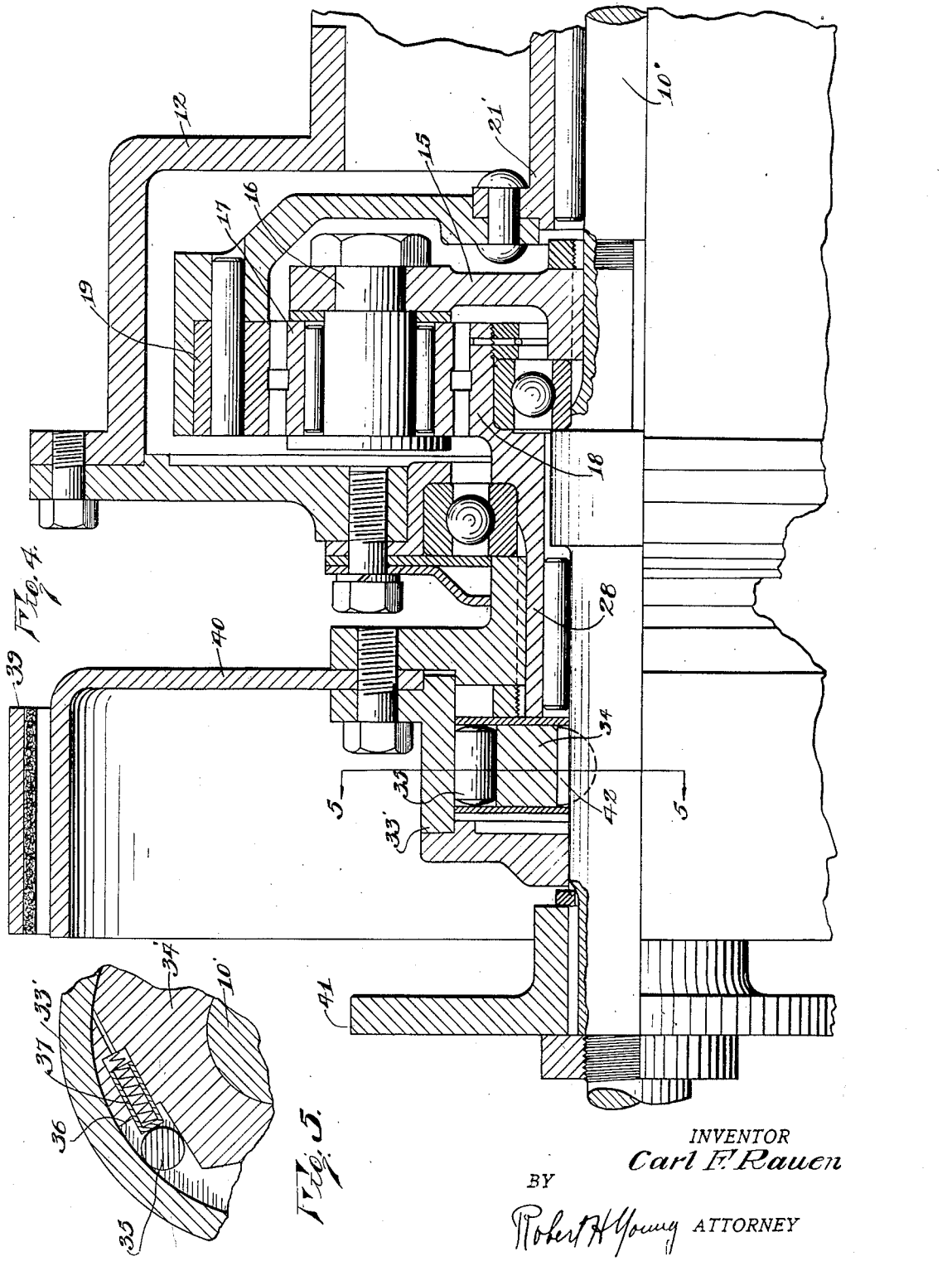

Patented Jan. 26, 1932

1,842,798

UNITED STATES PATENT OFFICE

CARL F. RAUEN, OF DAYTON, OHIO

POWER TRANSMISSION

Application filed October 19, 1923. Serial No. 669,544.

This invention relates to a power transmission for general adaptation, but herein more particularly designed for use in connection with a motor vehicle.

The principal object of the invention is to provide a transmission whereby the motive power will be automatically disconnected from the driven part in case the speed of the driven part exceeds that of the motor, and wherein the driven part is arranged selectively to be connected with the motor while the propeller shaft is over-running to drive the motor and thus brake the motion of the vehicle. It is a further object of the invention to utilize in the latter connection, planetary gearing and a one-way clutch together with means for variably restraining the rotation of one of the gears thereof during the over-running of the propeller shaft to secure a gradual braking action.

Another object of this invention is to provide a transmission which permits the change speed gears to be shifted without releasing the clutch and wherein the engine speed is not thereby immediately brought up to the corresponding car speed, which would be the case if it were not that a one-way clutch is provided permitting the driven shaft to over-run the driving shaft.

Still another object of the invention is to provide a transmission of this kind having an over-running clutch permitting the over-running of the propeller shaft as in coasting, for example, and which is also arranged to prevent the reverse rotation of the propeller shaft except when desired so that the vehicle in which the transmission is used can be held on a hill without the aid of the brakes or other means for preventing its movement down the hill, an advantage being that when power is applied to drive up the hill, the holding means automatically releases and the power is not used to overcome the action of brakes, as is the case in cars not equipped with the present transmission.

Aside from the foregoing objects, the invention is designed to provide a transmission giving a greater range of variable speeds, forward and reverse, without shifting gears, than has heretofore been possible.

The invention is described in connection with the accompanying drawings, in which:

Fig. 1 is a central vertical longitudinal section through a portion of the transmission gearing of the present invention.

Fig. 2 is a similar view of the remaining portion of the gearing.

Fig. 3 is a transverse sectional detail view taken on the line 3—3 of Fig. 1, looking in the direction indicated by the arrows.

Fig. 4 is a view similar to Fig. 1 of an alternative arrangement and,

Fig. 5 is a sectional detail similar to Fig. 3 taken on the line 5—5 of Fig. 4, looking in the direction of the arrows.

Throughout the views, the same or similar reference numerals are applied to corresponding parts.

Referring to the drawings, and for the present, particularly to Figs. 1, 2 and 3, the shaft 10 is a power-driven shaft constituting in this case either an integral extension of the crank shaft of the motor or otherwise rigidly coupled to the crank shaft to be driven therewith. The shaft 10 extends rearwardly through a housing 11 into a housing 12 for reception in the hollow inner end of the propeller or driven shaft 13 extending into the rearward end of the housing 12. The shafts 10 and 13 have suitable bearings in the housings 11 and 12 and the shaft 10 has also bearings in the shaft 13, all of which bearings are suitably anti-friction. The shaft 13 has a coupling member 14 for connection preferably through a universal joint and a differential with the rear axle sections of the motor vehicle in the usual manner.

The shaft 10 has keyed thereon a yoke 15, the free end of which carries three studs 16, only one of which appears in the drawings, on which planet gears 17 are mounted. The gears 17 mesh in between a sun gear 18 and an internally toothed ring gear 19. The gear 19 is rigid with a plate 20 secured upon a pinion 21 having a bearing in the housing 12 and on the shaft 10. The pinion 21 meshes with an idler gear 22 rotatable on a countershaft 23 received in suitable bearings in the housing 12. The gear 22 has a small gear 24 formed suitably integral therewith. A shift gear 25 is splined on the inner end of the shaft 13 to be meshed with the gear 24 in the low speed and second speed of the vehicle as will be presently described. The gear 25 has internal gear teeth 26 in the hub thereof to cooperate with the pinion 21 in the third or direct drive speed and the geared-up drive speed of the vehicle, as will also be pointed out hereinafter. A reverse idler gear 27 in the housing 12 is in constant mesh with the gear 25 and is arranged to be meshed with the gear 24 for the reverse drive of the vehicle.

The sun gear 18 is suitably integral with a sleeve 28 extending forwardly from the planetary gearing and mounted on roller bearings on the shaft 10. A pressure plate of a main foot-controlled clutch 29 is freely rotatable on the sleeve 28 and is normally urged inwardly by a compression spring 30 to move together into intimate contact with friction clutch discs 31 carried by the internal gear 19 and friction clutch discs 32 suitably held in the notched periphery of a shell of a one-way drive clutch 33 of the overrunning roller type. The shell, as appears in Fig. 3, is clutched with a cam 34 splined on the sleeve 28, by means of one or more cylindrical rollers 35 each of which operates in a notch 36 in the cam 34 between the cam and the shell, such clutching action occurring only in the event of relative rotation between the cam and the shell in one certain direction in a well understood manner. The roller 35 is normally urged toward its wedging clutching position by means of a spring-pressed plunger 37 operating in a cylinder opening off the notch 36 in the cam 34. It is understood that when the clutch 29 is in, the shell of the overrunning clutch is operatively connected with the ring gear 19 to turn with the latter. Manifestly, the roller 35 permits the rotation of the ring gear 19 relative to the sun gear 18 in one direction, but locks to prevent relative rotation in the reverse direction. This locking action is utilized in a manner to be hereinafter set forth. The clutch is arranged to be released in the usual manner by means of a fork 38.

The sun gear 18 is arranged to be controlled in its rotation, that is, to be stopped or slackened, by means of a brake band 39 gripping a brake drum 40 splined on the extreme forward end of the sleeve 28. The band 39 is suitably operated by a ratchet-held foot pedal or the like so that it may be held on for protracted periods of time. By varying the speed of rotation of the sun gear 18, or actually stopping the same, the speed of rotation of the ring gear 19 and consequently the speed of the propeller or driven shaft 13 may be varied within wide limits. Also in the event the propeller shaft overruns, that is, rotates at a greater speed than that at which it would normally be driven at a given engine speed, the ring gear 19 is arranged to drive the power-driven shaft 10 to effect dynamic braking of the vehicle and in this case, the dynamic braking effect may be brought about gradually and may be varied as desired by gripping the drum 40 to slacken or actually stop the rotation of the sun gear in a manner which will more clearly appear hereinafter. It will be understood that any suitable forms of braking means of frictional or magnetic principle may be utilized for the purpose referred to without departing from the invention.

It will also be understood that any number of change speed gears may be incorporated in this device, and the planetary gearing can be arranged to serve as step-down gearing so that the driven shaft will turn slower than the driving shaft instead of faster, as herein described.

In describing the operation of the transmission, the various speeds and various conditions of operation will better be discussed separately.

*Low speed.*—The main clutch 29 is released while the shaft 10 is being driven idle by the running of the motor of the vehicle. The gear 25 is meshed with the gear 24 and the main clutch is engaged. The planetary gearing is revolved as a unit and with it the gear 21 which in turn drives the shaft 13 through the reduction gearing 22, 24 and 25. The overrunning clutch 33 in this case serves to lock together the sun gear 18 with the ring gear 19 and the planet gears 17 do not revolve on their studs.

*Second speed.*—With the parts in their same relative positions as in first speed, second speed is secured by contracting the brake band 39 to stop the sun gear 18. This causes the planet gears 17 and 19 to operate around the sun gear 18 because they are revolved with the yoke 15 turning with the power driven shaft 10. The gear 19 operates at a higher speed than the engine, due to the action of the planet gears 17, so that an increased speed is given the shaft 13 through the same train of gears as were used in first speed. It will of course be understood that instead of actually stopping the sun gear 18 the same may be only slackened in speed and that as a consequence a variety of speeds may be secured. The ratchet holding the foot pedal for operating the brake band 39 will preferably permit holding the band in various degrees of contraction in an obvious way. The clutch 33 in this speed overruns because of the difference in speeds of the ring gear 19 and the sun gear 18.

*Direct drive—Third speed.*—The clutch may or may not be released and the gear 25 shifted to mesh the internal gear teeth 26 with the pinion 21, whereupon, when the clutch is again engaged, the shaft 13 is driven at a higher speed through the same operation of the planetary gearing as was stated in the description of the first speed arrangement, the increased speed being secured, because there is no reduction gearing in play between the pinion 21 and the shaft 13 as there was in first speed. This third speed is the speed which will probably be used generally for ordinary driving. The fourth speed available with the present transmission will probably be used as an economy for long steady runs or where the higher speed is of advantage otherwise.

*Geared up drive, or fourth speed.*—With the parts in the same relative positions as in third speed, the brake 39 is contracted as in second speed to stop or slacken the sun gear 18. In this case the increased speed over that secured in third speed corresponds to the difference in speed secured in second speed over that secured in first speed and in a similar manner, variations in speed may be secured by slackening the sun gear 18 more or less. It is apparent at this point that any number of changes may be provided in the change speed gearing and that a correspondingly larger number of speeds can be secured through the use of my transmission. In the present instance I secure four speeds with only two changes of gearing.

*Coasting or overrunning.*—When the vehicle is being driven in first or in third, at a certain driving speed, and the power is shut off partially or entirely, or in any case where the speed of the vehicle is increased over that at which it would be normally driven at the then engine speed, as by running down a grade, the shaft 10 turns at a slower speed than the internal gear 19 and as a result the sun gear is turned in the opposite direction to that in which it is turned when the engine is driving under ordinary conditions, thereby causing the clutch 33 to overrun so that the vehicle is permitted to coast without driving the engine and without releasing the main clutch 29.

*Dynamic braking.*—Assuming the conditions as just above described, the shaft 10 and hence the motor of the vehicle with which it is connected, may be driven from the shaft 13 through the intermediate gearing by slackening or stopping the sun gear 18 through the medium of the brake band 39. The more the sun gear 18 is slackened, the more the shaft 10 is driven by the propeller shaft so that quite a variation in the braking effect may be secured by varying the pressure of the brake band on the drum 40. The motor of the vehicle meanwhile may have its throttle set for idling gently but preferably has the ignition off. During this operation, the roller clutch 33 overruns in an obvious manner. The roller clutch 33 comes into play as a sprag or brake to prevent undesired rotation of the propeller shaft, if the vehicle is on a hill and the change gears are meshed for operating the vehicle up the hill and the brake band 39 is held on the drum 40. In this connection and also in second speed and geared up drive the pedal for operating the brake band can be held by its ratchet.

The alternative form of my invention shown in Fig. 4 is designed to be used in connection with the change gears shown in Fig. 2, the portion of the gear shown at 21' in this case corresponding to the inner end of the gear 21. The shaft 10' is in this case connected in a suitable manner by the coupling 41 with the driven discs or other driven part of a main foot-operated clutch of any ordinary type. The shaft 10' operates to drive the propeller shaft 13 through the same form of planetary gearing except that in this case the sleeve 28 on which the drum 40 is mounted does not carry the cam 34 of the overrunning roller clutch. The shell of the overrunning roller clutch 33' is herein carried upon the brake drum 40 and cooperates with a roller 35 and a cam 34 keyed in this case at 42 to the shaft 10'. The roller clutch here operates oppositely to that shown in Fig. 3, as will be apparent upon an inspection of the drawings.

In the operation of this alternative form, first speed drive is secured with the change gears in a position corresponding to that of the first speed drive of the other form above described. When the main clutch which does not appear in Fig. 4 is engaged, the shaft 10' operates the planetary gearing through the yoke 15 to drive the pinion 21' and from it the shaft 13 through the intermediate change speed gearing. The moment the yoke 15 moves, the sun gear 18 tends to rotate faster than the shaft 10' so that the overrunning clutch 33' locks. The driving then occurs with the planetary gearing locked and revolving as a unit. Second speed is secured as in the operation of the other form above described, simply by stopping or slackening the sun gear 18 by contraction of the brake band 39. In a similar way direct drive or third speed and geared-up drive are secured in this form as in the other form when the gear 25 is shifted so that the internal gear 26 meshes directly with the pinion 21'. The direct drive occurs when the planetary gearing is locked and revolves as a unit and the geared-up drive occurs when the sun gear is stopped or slackened by contracting the brake band 39. This form of the invention also permits of coasting and overrunning as in the other form, and in this case the ring gear 19, turning faster than the shaft 10', operates the sun gear 18 opposite to the direction in which it turns when driven, i. e., in a counter-clockwise direction. The clutch 33' during this time overruns so that the car coasts without driving the motor and without necessitating releasing the main clutch. If it is desired to dynamically brake the motion of the car, this can be done similarly as in the other form by slackening or stopping the sun gear 18 by contracting the brake band 39. When this is done the clutch 33' overruns.

With the brake band 39 is contracted on the drum 40, the roller clutch comes into play as an automatic sprag, to prevent the vehicle from drifting down hill, if the gears are meshed to go up, as the roller clutch which is being held stationary by the drum 40, will prevent the ring gear 19 from turning oppositely to the direction in which it is driven from the shaft 10. In other words, the ring gear 19 can rotate with respect to the sun gear 18 only in one direction. Thus when the vehicle is on a hill with gears meshed to go up either backwards or forwards, it will not coast or drift down the hill.

When the engine operates to drive the vehicle up the hill, all of its torque is directed to that purpose only and is not required to overcome the resistance brought into play by either the service or emergency brakes as is ordinarily the case in cars equipped with an ordinary form of transmission.

When shifting gears after the car is moving, it is not ordinarily necessary to release the main clutch when the speed of the driving shaft is less than that of the driven shaft. This is due to the fact that under these conditions, the clutch 33 is overrunning and the planetary gears are revolving together with the brake drum and it is not difficult to mesh the change gears since the parts referred to have practically negligible inertia as compared with the inertia of the engine itself which is the factor preventing shifting without releasing the clutch in a car having an ordinary transmission.

Another feature of the invention referred to above is that it provides more than one speed for reverse. Assuming either form of the invention to be applied to a vehicle and that the gear shift lever is in reverse, one speed is secured with the planetary gearing turning as a unit and a greater speed is secured by stopping or slackening the sun gear 18 by contracting the brake band 39.

The invention has been described in considerable detail and as applied to a motor vehicle in connection with which it has especial utility, but it is to be understood that, broadly speaking, the invention is capable of various adaptations and that the specific structure may be varied within wide limits without departing from the spirit of the invention as defined in the accompanying claims.

I claim:—

1. In a motor vehicle power transmission, a drive shaft turning with the vehicle prime mover, a driven shaft for propelling said vehicle, planetary gearing between said shafts, an automatic overrunning clutch connected between the sun and ring gears of said gearing, means to manually disconnect one of said gears from driving relation with said clutch, and braking means for retarding or stopping the movement of a part of said gearing.

2. In a motor vehicle power transmission, a drive shaft turning with the prime mover of the vehicle when operatively connected therewith, a driven shaft for propelling said vehicle, planetary gearing between said shafts, an overrunning one-way clutch connected between the sun and ring gears of said gearing permitting faster turning of said driven shaft freely relative to said drive shaft and with said gearing, means to manually disconnect said ring gear from driving relation with said clutch and braking means for restraining the sun gear whereby operatively to connect said driven shaft to said drive shaft to turn the prime mover for dynamically braking the motion of the vehicle.

3. In a power transmission, a drive shaft, a yoke carried thereby planetary gearing comprising a planet gear mounted on said yoke, a second gear and a driven gear meshing with said planet gear, a brake device to control the rotation of one part of the planetary gearing, a driven shaft operable from said driven gear, a one-way clutch having parts capable of relative rotation in only one direction, one of said parts moving with one part of the planetary gearing, and means for detachably connecting the other of said parts with said driven gear.

4. In a power transmission, a power driven shaft, a propeller shaft, planetary gearing between said shafts, a clutch for connecting said planetary gearing to drive said propeller shaft, a one-way drive device having connection with said clutch and planetary gearing permitting overrunning of said propeller shaft relative to said power driven shaft, and braking means for restraining the rotation of one of the gears of said planetary gearing for driving said power driven shaft from said propeller shaft when the latter overruns.

5. In a motor vehicle power transmission, a shaft driven by the prime mover of said vehicle, a propeller shaft, a planetary gearing between said shafts, a clutch for connecting said planetary gearing to drive said propeller shaft, a one-way drive device having connection with said clutch and planetary gearing permitting overrunning of said propeller shaft relative to said power driven shaft, and means for gradually and variably restraining the rotation of one of the gears of said planetary gearing to effect a braking action through the driving of said prime mover through said power driven shaft from said propeller shaft when the latter overruns.

6. Vehicle transmission mechanism comprising driving and driven elements, gearing adapted to be connected to said driving and driven elements whereby said driving element drives the driven element either in a forward or reverse direction, in combination with a one-way clutch device operatively connecting said driving and driven shaft and means yieldingly controlling said device and acting through said device to prevent reverse movement of the driven element when said gearing is set to drive the driven element in a forward direction and acting to prevent forward movement of the driven element when the gearing is set to drive the driven element in a reverse direction.

7. A motor vehicle transmission comprising in combination, planetary gearing, a drive member for said gearing, a driven member operated therefrom, a one-way clutch having one of its relatively rotatable parts to turn with an element of said gearing, and the other of its relatively rotatable parts to turn with one of said members, and brake means to hold said element including a connection with said planetary gearing effective upon any tendency of said driven member being actuated in the reverse direction by the vehicle load to prevent such movement of the driven member.

8. In a motor vehicle power transmission, a drive shaft turning with the vehicle prime mover, a driven shaft for propelling said vehicle, planetary gearing between said shafts, an automatic overrunning clutch connected between two elements of said gearing, means to normally disconnect one of said gears from driving relation with said clutch, and breaking means for retarding or stopping the movement of an element of said gearing whereby undesired rotation of the driven shaft is prevented.

In testimony whereof I affix my signature.

CARL F. RAUEN.